Figure 3:
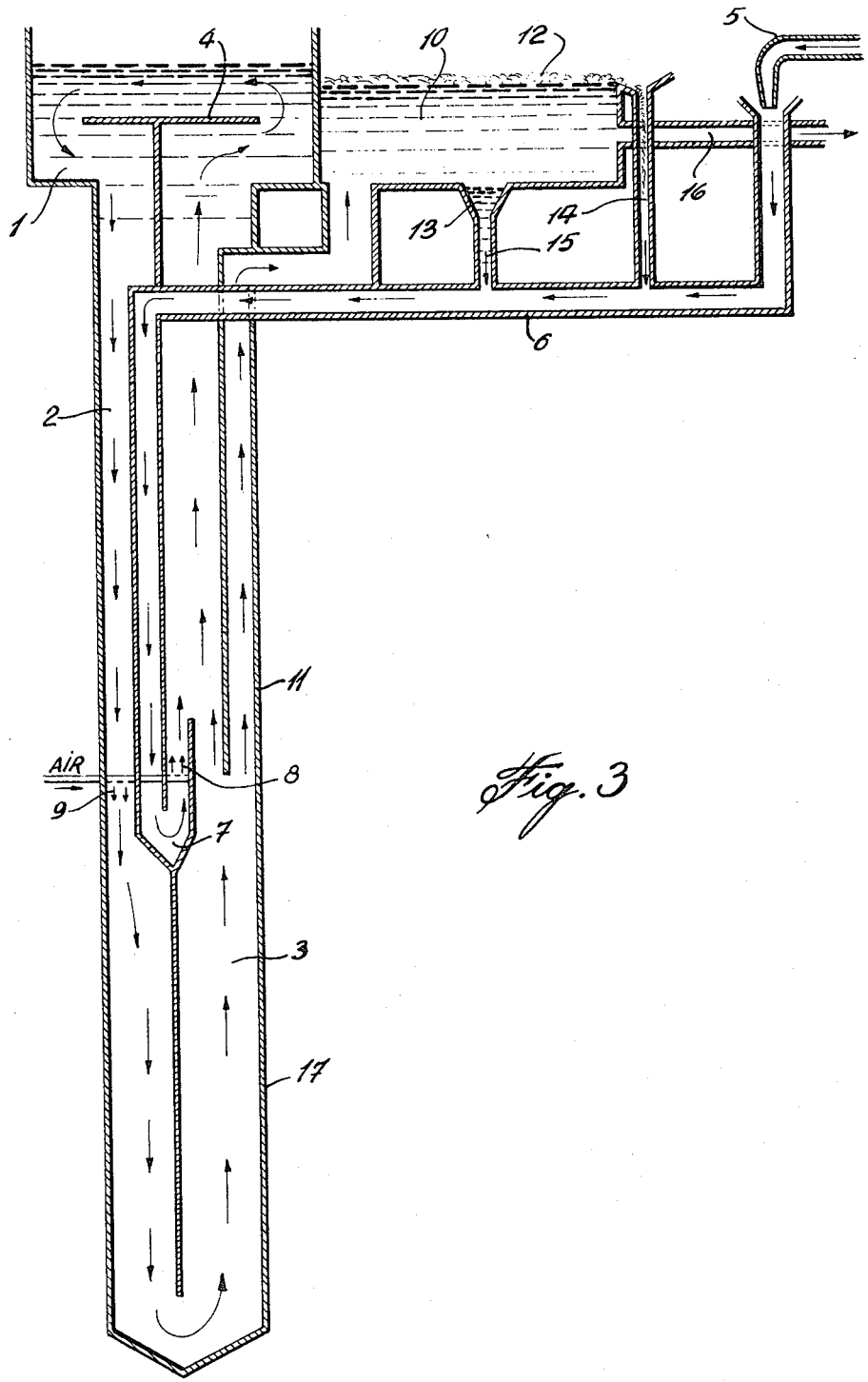

United States Patent [19]

Pollock et al.

[11] 4,367,146

[45] Jan. 4, 1983

[54] LONG VERTICAL SHAFT BIOREACTOR WITH MODIFIED WASTE LIQUOR INJECTION

[75] Inventors: David C. I. Pollock, Richmond Hill; Malcolm A. Wilson, Vegreville, both of Canada

[73] Assignee: C-I-L Inc., North York, Canada

[21] Appl. No.: 300,997

[22] Filed: Sep. 10, 1981

Related U.S. Application Data

[63] Continuation of Ser. No. 159,348, Jun. 13, 1980, abandoned.

[30] Foreign Application Priority Data

Oct. 26, 1979 [CA] Canada ................................. 338534

[51] Int. Cl.$^3$ .............................................. C02F 3/12
[52] U.S. Cl. .................... 210/608; 210/626; 210/629; 210/195.3; 210/221.2
[58] Field of Search ............... 210/608, 621, 622, 623, 210/626, 627, 629, 741, 744, 97, 104, 109, 123, 128, 129, 130, 132, 195.1, 195.3, 220, 221.2, 744; 137/571, 593

[56] References Cited

U.S. PATENT DOCUMENTS 3,476,682 11/1969 Albersmeyer ...................... 210/626
3,932,282 1/1976 Ettelt .................................. 210/221.2
4,086,160 4/1978 Roesler ............................... 210/608
4,100,071 7/1978 Beurer ................................. 210/220

FOREIGN PATENT DOCUMENTS 33200 2/1909 Sweden ............................ 210/221.2
949439 2/1964 United Kingdom ................ 210/623

OTHER PUBLICATIONS

Proceedings of the 31st Industrial Waste Conference, May 4, 5, 6, 1976, Purdue University, Ann Arbor Science, U.S.A., pp. 344-351.

Primary Examiner—Ernest G. Therkorn
Attorney, Agent, or Firm—Donald G. Ballantyne

[57] ABSTRACT

An improved method and apparatus is provided for the treatment of sewage waste in a long vertical shaft bioreactor wherein waste sewage is caused to circulate under air injected oxidizing conditions around a loop comprising adjacent riser and downcomer chambers connected at their upper and lower ends. The improved method comprises the steps of introducing influent waste at depth into the riser chamber at a point higher in the riser than the point of air injection and withdrawing treated effluent from the riser at a point lower in the riser than the point of air injection. A separation chamber may also be operatively connected to the riser chamber to recover sludge for return to the bioreactor. The method provides an improvement in oxygen uptake rate and reduces the anoxic zone in the reactor thus providing additional capacity for BOD$_5$ removal.

6 Claims, 3 Drawing Figures

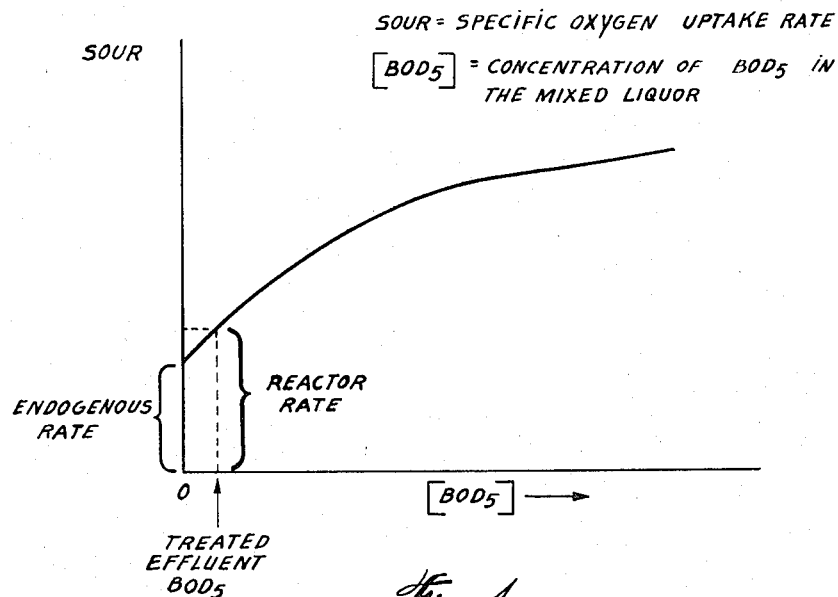
Fig. 1 BACK-MIXED REACTOR
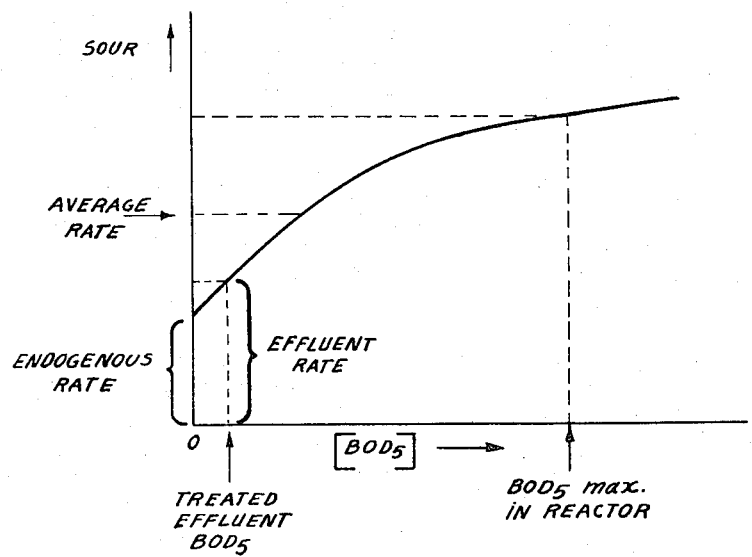
Fig. 2 PLUG FLOW REACTOR

LONG VERTICAL SHAFT BIOREACTOR WITH MODIFIED WASTE LIQUOR INJECTION

This is a continuation of application Ser. No. 159,348 filed June 13, 1980, now abandoned.

This invention relates to an improved apparatus for the treatment of sewage or industrial waste, in a long vertical shaft bioreactor. In particular the invention provides for an improved means whereby waste influent may be introduced into such a bioreactor.

Long or deep vertical shaft bioreactors suitable for the treatment of sewage or industrial waste by a modified activated sludge process are known, having been disclosed, for example, in Canadian Pat. No. 1,033,081 to Bailey et al. Such reactors comprise a circulatory system including at least two substantially long vertical, chambers communicating with each other at their upper and lower ends, the upper ends being connected through a basin. A mixed liquor normally comprising water, organic matter, sludge and nutrients is caused to descend one chamber, the downcomer, and ascend the other chamber, the riser. Oxygen, normally in the form of air, is injected at depth into the mixed liquor stream as it passes through the downcomer chamber and an aerobic biological reaction takes place in which the organic matter is oxidized by the microorganisms present. Normally the mixed liquor is driven through the system by the injection of the pressurized oxygen-containing gas, which injection may be made into one or both of the chambers. At start-up of the reactor, the air injection is made into the riser and acts in the nature of an air lift pump. Once circulation of the mixed liquor begins, air injection can then be made into the downcomer only, the liquor in the downcomer having a higher density than the liquor/bubble mixture in the riser, thus providing sufficient momentum to maintain a circulation of the mixed liquor.

In the process involving the apparatus of Bailey et al., influent waste is introduced into the basin at a position adjacent to the upper end of the downcomer chamber. Treated mixed liquor is drawn off from the basin at a position adjacent to the upper end of the riser chamber. The oxygen-containing gas injected into the downcomer dissolves in the mixed liquor as the liquor descends to regions of greater hydrostatic pressure. As the liquor rises in the riser to regions of lower pressure, the dissolved gas separates from the liquids to form bubbles. The reaction which takes place between waste, oxygen, nutrients and biomass, produces carbon dioxide, water, additional biomass and cellular material. The cellular material together with any insoluble matter and suspended organics present forms a sludge.

By way of fuller understanding of the subject matter of the present invention, reference is made to the accompanying drawings wherein FIG. 1 is a diagram illustrating the relationship between the specific oxygen uptake rate and $BOD_5$ concentration in the mixed liquor of a back-mixed bioreactor, FIG. 2 is a diagram illustrating the relationship between the specific oxygen uptake rate and $BOD_5$ concentration in the mixed liquor of a plug flow bioreactor, and FIG. 3 is a diagrammatic elevational view of the bioreactor of this invention and an associated separation apparatus.

It is known that in an activated sludge process, the rate of oxygen uptake and therefore the removal of biological oxygen demand (normally measured as $BOD_5$—biological oxygen demand, five days), depends on the $BOD_5$ concentration of the mixed liquor being treated, which mixed liquor generally comprises aqueous fluid, biologically degradable waste, biomass and nutrients. The relationship between oxygen uptake and $BOD_5$ proceeds according to the Michaelis-Menten relationship depicted in FIG. 1. FIG. 1 describes the case of a completely back-mixed reactor, where the $BOD_5$ concentration is constant throughout. Under these circumstances, the specific oxygen uptake rate is equivalent to the effluent $BOD_5$ value. Thus the oxygen uptake rate and the $BOD_5$ removal rate is limited by the value of $BOD_5$ required in the particular treatment process application.

In plug flow systems such as in long vertical shaft reactors, the $BOD_5$ concentration of the mixed liquor being treated in the reactor decreases in the direction of flow and thus the specific oxygen uptake rate and the consequent $BOD_5$ removal rate decreases with time. This is illustrated in FIG. 2 where the average oxygen uptake rate can be seen to be in excess of the effluent equivalent rate but less than the maximum rate in the reactor.

Thus in a long vertical shaft bioreactor such as is disclosed in Canadian Pat. No. 1,033,801, the maximum oxygen uptake rate occurs where the capability to transfer oxygen to the biomass is least, that is at the top of the downcomer chamber where the raw waste is introduced into the bioreactor. Thus operation of this bioreactor is limited to relatively low concentrations of waste and biomass in the mixed liquor. When higher concentration waste and biomass are processed, there results an anoxic zone which extends from just below the waste liquor inlet location at the surface down to the region of the air injection in the downcomer chamber. In this anoxic zone not only does no $BOD_5$ removal take place but an additional oxygen demand is present from the higher concentration of waste and biomass which is rich in biodegradable content. Since this anoxic zone may represent from about 12% to 15% of the bioreactor shaft volume, any means by which the extent of the zone can be reduced would provide additional capacity for $BOD_5$ removal.

The difficulty above described is overcome in the improved long vertical shaft bioreactor apparatus of the present invention which apparatus comprises an upper basin, a downcomer chamber and a riser chamber operatively communicating with each other at their upper and lower extremities, communication at the upper extremities being through the upper basin both downcomer and riser having means for the injection therein at depth of an oxygen-containing gas, the improvement comprising a waste influent conduit operatively opening into the riser chamber at depth at a position higher in the riser chamber than the point of gas injection into said riser chamber, and a mixed liquor effluent conduit operatively discharging from the riser chamber at a position below the point of gas injection into said riser chamber.

When separation of the sludge produced in the bioreactor is carried out by flotation or sedimentation or both, the invention comprises additionally a flotation sedimentation separation apparatus positioned adjacent to the bioreactor upper basin, said separation apparatus being operatively connected to the riser chamber.

Sludge produced in the bioreactor and separated from the bioreactor effluent sedimentation or flotation or a combination of these, may be recycled for additional treatment in the bioreactor. The apparatus of the invention provides a means for the injection of recycle sludge into the bioreactor riser chamber through a sludge return conduit operatively connected to the riser chamber at a position above the point of gas injection into the riser but adjacent to the point of discharge of the waste liquor influent duct. Alternatively, the sludge recycle conduit may be connected operatively to the waste liquor influent duct itself so that the recycled sludge mixes with the influent waste prior to injection of the latter into the bioreactor riser. The point of termination of such an influent/sludge duct where it is operatively connected to the riser chamber, is preferably in the form of a U-shaped exhaust member. This configuration causes the influent waste liquor and sludge to be exhausted in an upward direction through an upward extending arm of the U-shaped member. Where a U-shaped exhaust member is employed, means are also provided for injecting an oxygen-containing gas into the influent sludge at a position within the confines of the upwardly extending arm of the U-shaped exhaust member.

In FIG. 3, the long vertical shaft portion of a vertical bioreactor is generally designated as 17. An upper basin 1 communicates with downcomer 2 and riser 3. Baffle 4 is adapted to channel the flow of mixed liquor across basin 1. Waste from, for example, a municipal sewage collector, enters the bioreactor system from pipe 5 which discharges into waste sludge influent duct 6. influent duct 6 discharges into riser 3 at depth through U-shaped exhaust member 7. Waste liquor is driven or lifted through the riser 3 by the action of air sparger 8 which also serves to aerate the liquid waste in riser 3 as it rises to basin 1. At 9 is shown a sparger which injects air into downcomer 2. A flotation tank 10 is connected to riser chamber 3 by effluent duct 11, the inlet of duct 11 within riser 3 being positioned lower in riser 3 than the outlet of U-shaped exhaust member 7. Sludge floated from effluent in tank 10 is shown at 12 and sedimented sludge is shown at 13. These sludges are recycled to influent/sludge duct 6 through ducts 14 and 15 respectively. Treated water leaves the bioreactor through pipe 16.

Waste-containing liquids to be treated by the apparatus of this invention will first normally be subjected to a primary treatment by physical methods such as screening and sedimentation to remove large suspended solids. After such primary treatment the waste is carried by pipe 5 to the secondary treatment provided by the present invention, entering the bioreactor through influent/sludge duct 6. As the waste liquor passes along duct 6, it is mixed with sludge already separated during the process, such sludge entering through ducts 14 and 15. Influent duct 6 discharges into riser 3 through U-shaped exhaust member 7. The outlet of member 7 is typically positioned at a level of from 50 to 250 feet below the level of liquid in basin 1. As it passes through member 7, the waste/sludge is aerated by an oxygen-containing gas injected at sparger 8. Due to injection at depth, a high level of oxygen solution in the mixed liquor will occur. Sparger 8 also serves to produce an air lift action helping to draw influent into the bioreactor. The aerated mixed liquor ascends riser 3 to surface basin 1, where gas disengagement occurs. After traversing basin 1 the mixed liquor descends downcomer 2 wherein it is further aerated by sparger 9. As the mixed liquor descends to regions of greater hydrostatic pressure, oxygen solution in the liquid increases further biochemical reaction involving oxygen, biomass and waste proceeds. As the liquor ascends riser 3, dissolved gas comes out of solution due to reduced hydrostatic pressure. A portion of the riser stream is diverted by effluent duct 11 to flotation tank 10. In effluent duct 11 small bubbles formed in the rising effluent cling to solid particles and so carry the sludge produced by the reaction upwards to flotation tank 10. The force driving the stream through the effluent duct 11 is derived from the air lift effect of sparger 8 and the lower density of the effluent stream. In flotation tank 10, floated sludge 12 collects on the surface and is recycled to the influent stream for further biodegradation. Sedimented sludge formed in tank 10 is also recycled to the influent stream. Treated water leaves the bioreactor through pipe 16.

By "oxygen-containing gas" is meant oxygen or a gaseous mixture containing oxygen such as air or oxygen-enriched air. Injection of oxygen-containing gas into the influent at depth prior to the influent/sludge entering the riser chamber has several noted advantages. Oxygen is contacted with the waste at the point of high oxygen demand or requirement and, since the oxygen-containing gas is injected at depth, its rate of dissolution in the water will be high. The gas injection in the upturned arm of the U-shaped influent duct constitutes an air lift pump which draws the influent/sludge into the riser chamber. As a result, flow of influent/sludge into the bioreactor is not dependent solely upon the influent stream having a higher density than the other flowing streams in the bioreactor. Injection of the oxygen-containing gas at a point in the riser chamber higher than the inlet of the duct carrying effluent to the flotation tank minimizes the amount of gas bubbles in the effluent being floated.

It is possible to provide as much as ⅔ of the oxygen required by the described process by the injection of oxygen-containing gas into the influent stream. By thus reducing the amount of gas injection in the downcomer stream, the proportion of gas bubbles in the effluent flotation stream, referred to herein as voidage, is reduced. It has in fact been found that voidage in the effluent stream can be controlled be adjustment of gas injection in the downcomer. By reduction of voidage in the effluent stream, gas stripping is minimized and flotation of solids is more effective. By "gas stripping" is meant the stripping of dissolved gas from the rising bioreactor stream by rising gas bubbles. However, a certain amount of gas stripping in the riser is needed in order to reduce carbon dioxide in the system and so avoid lowering the pH of the mixed liquor to a value harmful to the biomass. The apparatus of the present invention allows for gas stripping in the riser but not in the effluent duct.

Gas injection in the upturned outlet arm of the U-shaped influent duct additionally provides for bioreactor stability. The liquid waste streams in the bioreactor can be ranked in order of density as follows: riser (least dense); effluent to flotation tank; downcomer; influent waste water (most dense). Normally liquid in the riser will have a voidage of 5% to 25% at its top zone. Liquid in the effluent to the flotation tank can have a voidage of 2% to 5% without adversely affecting flotation. There will be substantially no voidage in the influent waste liquor. The difference in density resulting from differences in voidage thus are sufficient to force influent waste into the riser. However, differences in density between the influent and the effluent to the flotation tank are not sufficient to overcome pipe line losses at design flow rates and thus are not sufficient to move the fluid streams in and out of the bioreactor at velocities needed for economic operation. When this condition of low density differential between influent and effluent streams is combined with gas injection in the downcomer, the streams in the bioreactor become unstable and are vulnerable to reversal of flow which can lead to an eruption of mixed liquor from the reactor. However, injection of gas into the upturned arm of the U-shaped influent duct constitutes an air lift pump which creates a differential head between influent and effluent lines. This differential is dependent upon the length of the upturned arm of the influent duct and can be equivalent to 10 to 20 feet of water. This differential is sufficient to move liquids in and out of the bioreactor without depending upon differences in voidage. Operation of the bioreactor of the present invention thus has substantially increased stability. Combined influent injection and effluent take-off at depth from the riser of the bioreactor increases the length of the reaction path of the waste passing through the bioreactor.

It is believed that a high level of oxidation can be achieved in the upturned arm of the influent duct without causing "slugging" or erratic flow. This is because under the conditions of increased pressure the mixture of liquid and gas in the influent duct has a high mass but low volume. "Slugging" is to be avoided as it causes changing stream velocities and so adds to hydraulic losses.

What we claim is:

1. A long vertical shaft apparatus for the aerobic biological treatment of waste by a modified activated sludge process involving the continuous circulation of waste liquor within the shaft apparatus, the said apparatus comprising:
   (a) an upper surface basin,
   (b) a long vertical first downcomer chamber within the shaft,
   (c) a long vertical first riser chamber within the shaft, operatively communicating with the said first downcomer through the basin and at the lower end of said first downcomer to form a circulation loop,
   (d) a second vertical downcomer chamber within the shaft and having an outlet in communication with the said first riser chamber, the said outlet being aligned for the introduction of waste influent into the said circulation loop in the direction of flow of the said circulating waste in the said first riser,
   (e) a second vertical riser chamber within the shaft and having an inlet in communication with the said first riser chamber for the removal of waste effluent from the said circulation loop in the said first riser,
   (f) injection means within the said first downcomer chamber for the addition of oxygen-containing gas to circulating waste within the said loop,
   (g) injection means within the said second vertical downcomer chamber for the addition of oxygen-containing gas to the influent waste at a position prior to the said chamber outlet, the said second downcomer chamber outlet being located within the said first riser at a position higher up in the first riser than the inlet of the said second vertical riser chamber.

2. An apparatus as claimed in claim 1 also comprising a sludge flotation/sedimentation chamber operatively connected to the said second riser chamber and the said second downcomer chamber, recyclable sludge from said flotation/sedimentation chamber being adapted to discharge through said connected second downcomer into said first riser chamber.

3. An apparatus as claimed in claim 2 wherein the said sludge recycle second downcomer also comprises a waste liquor influent conduit.

4. A modified activated sludge process for the aerobic biological treatment of waste liquor in a long vertical shaft apparatus, said apparatus comprising a surface basin, a long vertical downcomer chamber, a separate long vertical riser chamber operatively communicating with the downcomer chamber through the basin and at the lower end of the downcomer to form a circulation loop, means to continuously circulate waste liquor around the said circulation loop, a second separate vertical downcomer chamber within the shaft for the introduction of untreated waste liquor influent into the circulation loop and a second separate vertical riser chamber within the shaft for the withdrawal of treated waste liquor effluent from the circulation loop, which comprises introducing waste liquor influent into the circulating waste in the direction of flow of the waste rising within the riser chamber, the point of introduction of said influent being at a position of from 50 to 250 feet below the said surface basin, injecting oxygen-containing gas into the said waste liquor influent at a position preceding the point of waste influent introduction into the said rising, circulating waste and withdrawing waste liquor effluent from the said circulating loop at a position within the shaft lower than the position where the said aerated waste influent is introduced into the said rising circulating waste.

5. A method as claimed in claim 4 wherein the said waste effluent is separated into a sludge fraction and a liquid fraction in an operatively connected flotation/sedimentation chamber, the said sludge fraction thereafter being reintroduced into the said first riser chamber via the said second downcomer chamber for further treatment.

6. A method as claimed in claim 5 wherein the said sludge fraction is combined with influent waste prior to introduction into the said first riser.

* * * * *